Oct. 30, 1934.   C. H. COOLIDGE   1,978,989
SEAM PROTECTING DEVICE FOR CLOTH SHEARING MACHINES
Filed Dec. 14, 1931    6 Sheets-Sheet 1
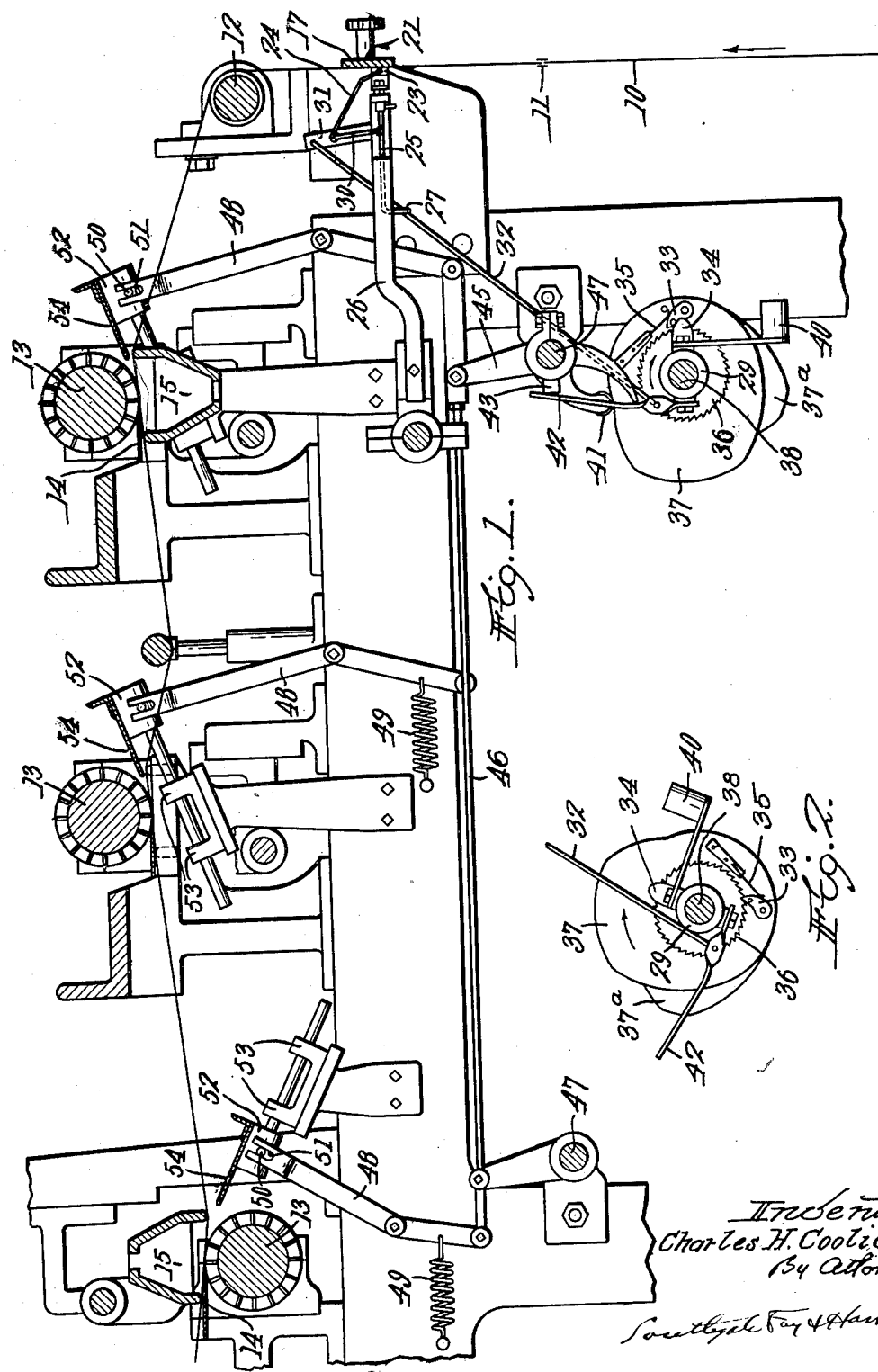

Oct. 30, 1934.  C. H. COOLIDGE  1,978,989
SEAM PROTECTING DEVICE FOR CLOTH SHEARING MACHINES
Filed Dec. 14, 1931  6 Sheets-Sheet 5

Inventor
Charles H. Coolidge
By Attorneys
Southgate Fay & Hurley

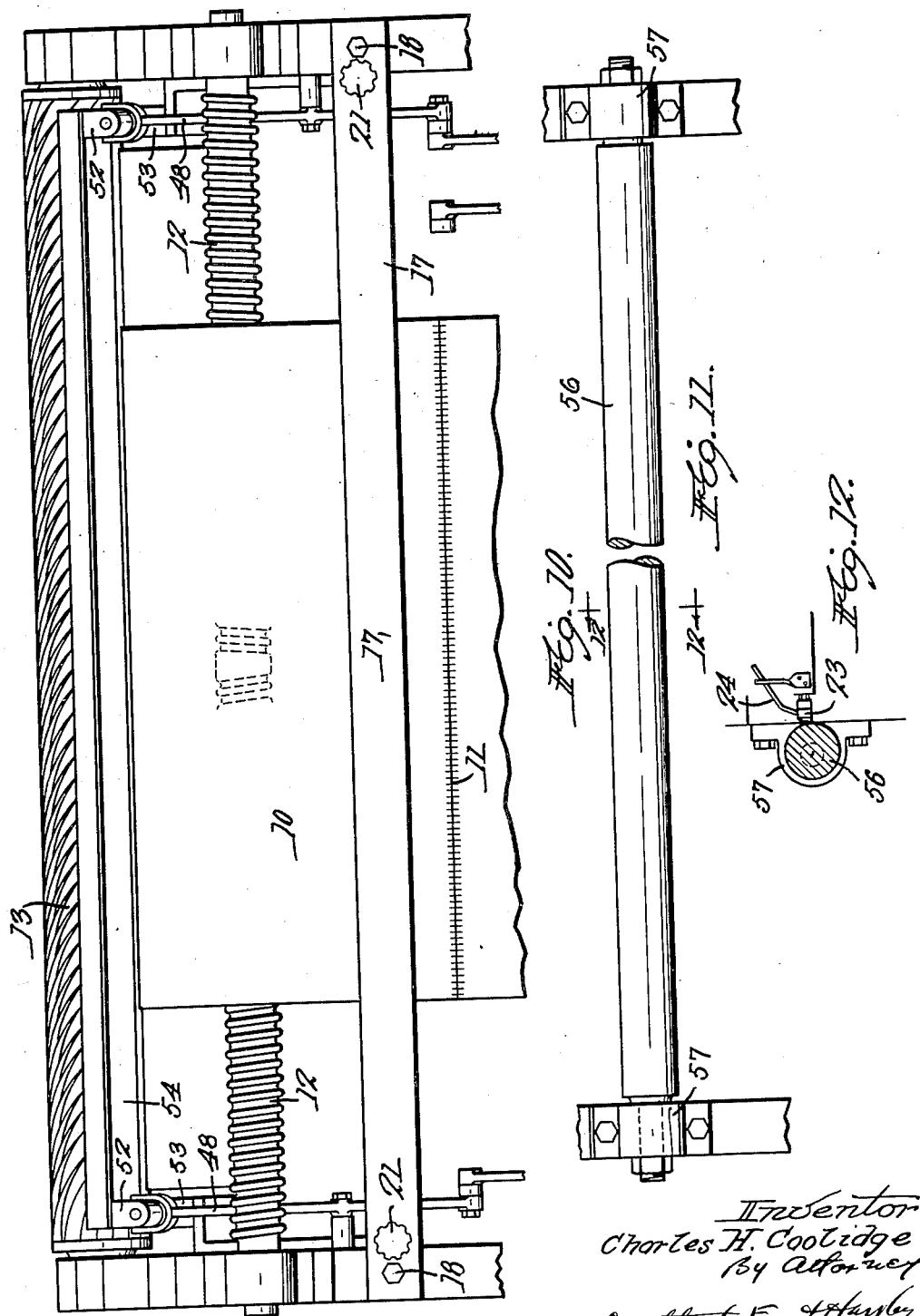

Patented Oct. 30, 1934

1,978,989

UNITED STATES PATENT OFFICE 1,978,989

SEAM PROTECTING DEVICE FOR CLOTH SHEARING MACHINES

Charles H. Coolidge, Worcester, Mass., assignor to Curtis & Marble Machine Company, Worcester, Mass., a corporation of Massachusetts Application December 14, 1931, Serial No. 580,759

15 Claims. (Cl. 26—17)

This invention relates to improvements in the art of shearing lengths of fabrics which are sewed together end to end and pass through the shearing machine continuously.

The principal objects of the invention are to provide means whereby the shearing will be interrupted at the seams, by which two lengths of fabric are sewed together and to provide for the effective working of the same at high speeds; to provide a construction in which the old principle of interrupting the shearing at the seam can be applied to the new development in the art in which each two lengths of cloth are sewed together by a butt seam, instead of the old type in which each of the two ends are left free beyond the stitching, thus usually providing three thicknesses of cloth which can be detected very readily; to provide an arrangement by which the sewing which adds to the single thickness of cloth only the thickness of two threads, one on each side, will be sufficient to operate the detector and interrupt the shearing at the proper time; to provide such a strong and quick-acting arrangement that, even at high speeds, the shearing is interrupted over only a very small area; to provide means whereby the action is a double one, operating first a detector finger and thereafter a contact finger, in which the latter can act much more effectively to provide for the necessary interruption of the operation; to introduce the protecting means along a plane instead of a curved line of travel, and to provide improvements over the arrangement shown in the patent to Broman No. 1,255,980.

Other objects and advantages of the invention will appear hereinafter.

Reference is to be had to the accompanying drawings, in which

Fig. 1 is a longitudinal sectional view of a shearing machine illustrating the application of this invention thereto;

Fig. 2 is a view of the cam and ratchet shown in a different position from that illustrated in Fig. 1;

Fig. 10 is a plan of the spreader and associated parts of the machine;

Fig. 11 is a plan showing a modified way of adjusting the straight edge against which the cloth travels and with the detector in position, and Fig. 12 is a sectional view thereof on the line 12—12 of Fig. 11.

Figure 3:
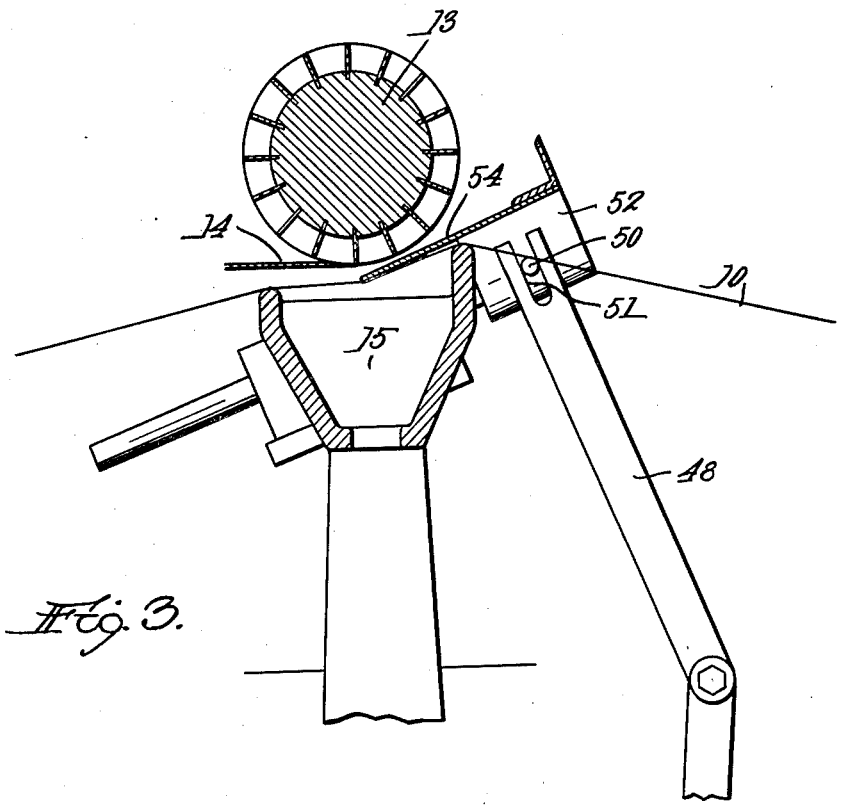
Figs. 3 and 4 are enlarged sectional views showing the pushing of the cloth away from the top and bottom shears respectively.

In February 1918 Patent No. 1,255,980 was issued to John Broman and assigned to Curtis & Marble Machine Company for a seam protecting device for cloth shearing machines. It claimed the insertion between the cloth and the cutting elements of a protecting plate thrown manually, by a swinging motion, into operating position at a point where the cloth was unsupported between the two edges of a twin edged or gap rest. At the time said patent was issued the common practice was to unite the ends of the two pieces of cloth by a seam spaced a short distance from the extreme ends, leaving unrestricted projecting ends beyond the sewing line. These two projecting ends when laid upon the cloth gave a bulky three-fold body of fabric, the blade deflecting the fabric to that extent.

With the introduction of what is known as the butted seam, the two adjacent ends of the cloth are united by a series of stitches crossing from one piece of fabric to the other and there is no overlapping of the fabrics. The only added thickness is the thread above and below the fabric at the point of joining. With the early type of seam and its three fold thickness of fabric, this added thickness at the seam was readily detected and various methods were used to connect the detector with the protecting means introduced.

The comparatively slow movement of the cloth in the earlier machines also aided in introducing protecting means. The butted seam presents very little additional thickness at the point of joining and necessitates a much more delicate adjustment of detecting devices and a much more rapid introduction of the protecting device. This speed of fabric is often as high as ninety yards per minute or one and a half yards per second.

I substitute for the pivotal arc protecting device a protecting plate moving into operating position along a plane substantially parallel to the line of travel of the cloth and, instead of the manual operation, a mechanically operated detecting device, sensitive in its adjustment and communications. It detects the additional thickness and communicates its motion, multiplied, to an operating mechanism that is connected by suitable mechanical devices to the plate operating means.

A detector finger is used, preferably a segment having a broken face, mounted at the end of a horizontal spindle, longitudinally located in reference to the machine, the face of the segment being in a plane parallel to the plane of the cloth at the point of contact. The adjustment of this detector finger is such that the slight added thickness of the seam over the normal thickness of the fabric causes the finger to move in its arc, such movement throwing into operating position a contact finger. The movement of the plate is brought about by the movement of the contact finger which throws, through mechanical connections, a pawl mounted to engage a ratchet upon the cam shaft.

In Fig. 1 is shown enough of a shearing machine of the type illustrated in the Broman patent, above mentioned, to show the application of this invention thereto. The cloth 10 is shown as having a butt joint 11 formed by abutting the ends of the two lengths of cloth together and sewing over and over around the same. This fabric may be very thin and the threads also may be very fine. This invention is capable of use for the finest grades of cloth and the finest threads that are used for sewing the cloth together. The cloth as usual passes over the usual spreader 12 and guide rods and also through a series of shearing devices for shearing both the upper and lower surfaces. Each shear consists of a cylinder 13 having shearing blades thereon arranged helically or otherwise and a stationary blade 14. The cloth is so guided that it comes in contact with the back surface of the stationary blade and the rotary shear 13 will cut off projections extending beyond the surface of the cloth. In this case, as has been customary, a twin edged or gap rest 15 is used in connection with the shear, this rest having two cloth supporting surfaces spaced apart. It will be seen that this rest accurately holds the cloth in proper position for shearing action to take place. These rests are mounted on the frame in the usual manner.

The cloth, as shown, comes up behind a flexible steel guide 17. This guide, in the form now being described, is mounted on the frame by two bolts 18 and is provided with two adjusting screws 19, each screwing into a block 20 on the inner side of the frame. Each screw is provided with a notched or knurled head so that it can be operated easily and with a shoulder 21 which engages the guide or bar 17. These two screws at the ends are adapted to flex the bar 17 so that at its center it can be moved to get very fine adjustments.

At the center of the bar 17 is located the controlling device. This consists of two members, a light feeler finger 23 and a strong contacting finger 24. The feeler finger is fixed on an oscillatable rod 25 supported by a bracket 26 carried fixedly by the frame of the machine. This feeler finger, by the adjustment of the bar 17, is mounted so as to practically engage the cloth which passes between it and the bar. When the butt seam 11 comes upwardly under this feeler finger the added thickness due to the threads forming the seam on both sides will cause the feeler finger to rise and the rod 25 to turn with it. This finger is a very light finger and it is constructed so as to turn very easily when the obstruction engages it. The end of the wire 25 is bent over at 27 to come under the rod 26 and normally hold the feeler finger in horizontal position, in the form shown.

Figure 9:
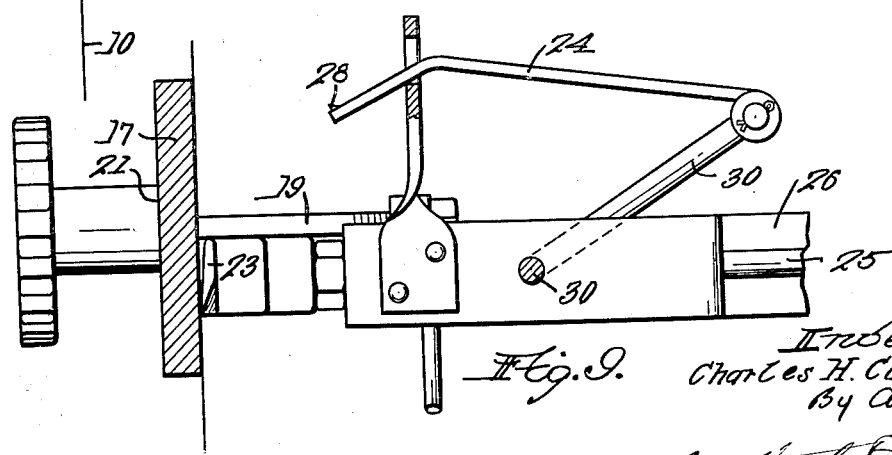
Fig. 9 is a similar view showing the parts after they have operated.

The contact finger 24 rests on the feeler finger and is pivotally mounted. When the feeler finger rises, the contact finger is moved thereby into a position so that the barbs 28 or roughened surfaces on its end will engage the cloth, which swings the contact finger back, as shown in Fig. 9. This is the only function of the feeler finger. The feeler finger brings the contact finger upwardly into contact with the cloth and the barbs on the contact finger engage the cloth so that the rapid movement of the cloth positively swings the contact finger up quickly out of contact with the cloth, as shown in Fig. 9.

The contact finger is pivotally connected with an arm on a rod 30 carried by the frame. This rod has another arm 31 which, when it is turned by the operation of the contact finger, pulls a rod 32 with which it is pivotally connected. The rod 32 is pivotally connected with an arm 42 fixed to a loose collar 29 on the shaft 38. The function of this rod is to throw into engagement a pivoted pawl 33 by removing from it a projection 34 on the loose collar 29 which normally holds the pawl out of action against a spring 35. When this projection 34 is withdrawn the spring pushes the pawl against a ratchet 36 which is fixed on the shaft 38. This pawl 33 is pivoted on a cam 37 loose on the shaft 38 which, by means of a chain and sprocket wheel 39 is constantly rotated from the draft roll shaft (not shown). Therefore the rotation of this ratchet wheel will carry the cam around with it as long as the pawl is in engagement with the teeth thereof. Another cam 37$^a$ is fixed to the hub of the cam 37 and of course, rotates at the same time. This cam is connected, as will be described, to operate to interrupt the shearing on the bottom surface of the cloth, while the cam 37 controls the top shearing. A separate cam can be used for each shear or a single one for all of them.

Fig. 1 shows the position of the parts when at rest and before the butt seam 11 has engaged the feeler finger and operated the contact finger. Fig. 2 shows the position of the parts after that action has taken place and while the pawl 33 is in engagement with the ratchet wheel and that is carrying the cams around positively with the shaft 38.

It will be seen that, as the ratchet wheel rotates, as indicated by the arrow in Fig. 2, the link or rod 32 also moves with it at the lower end until it engages the hub or shaft. When the rod 32 is forced down, the action is sudden and it swings up a counterweight 40 on the collar 29. The counterweight returns the collar and projection 34 at once into the position shown in Fig. 1. The projection 34 is now in position to trip the pawl out of the teeth. Also as the arm 42 comes against stops 43 the rod 32 is stopped in this position.

Figure 4:
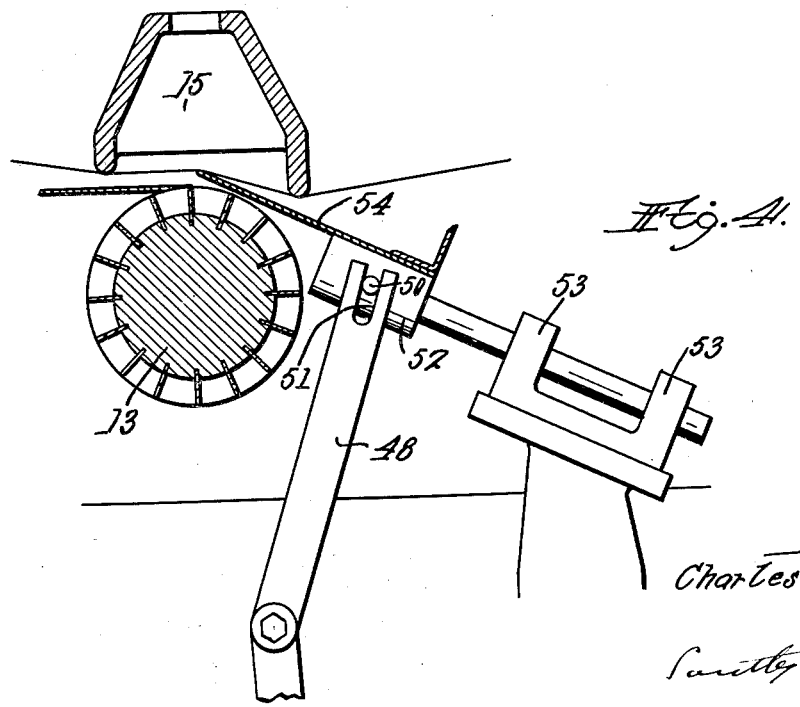
Figure 5:
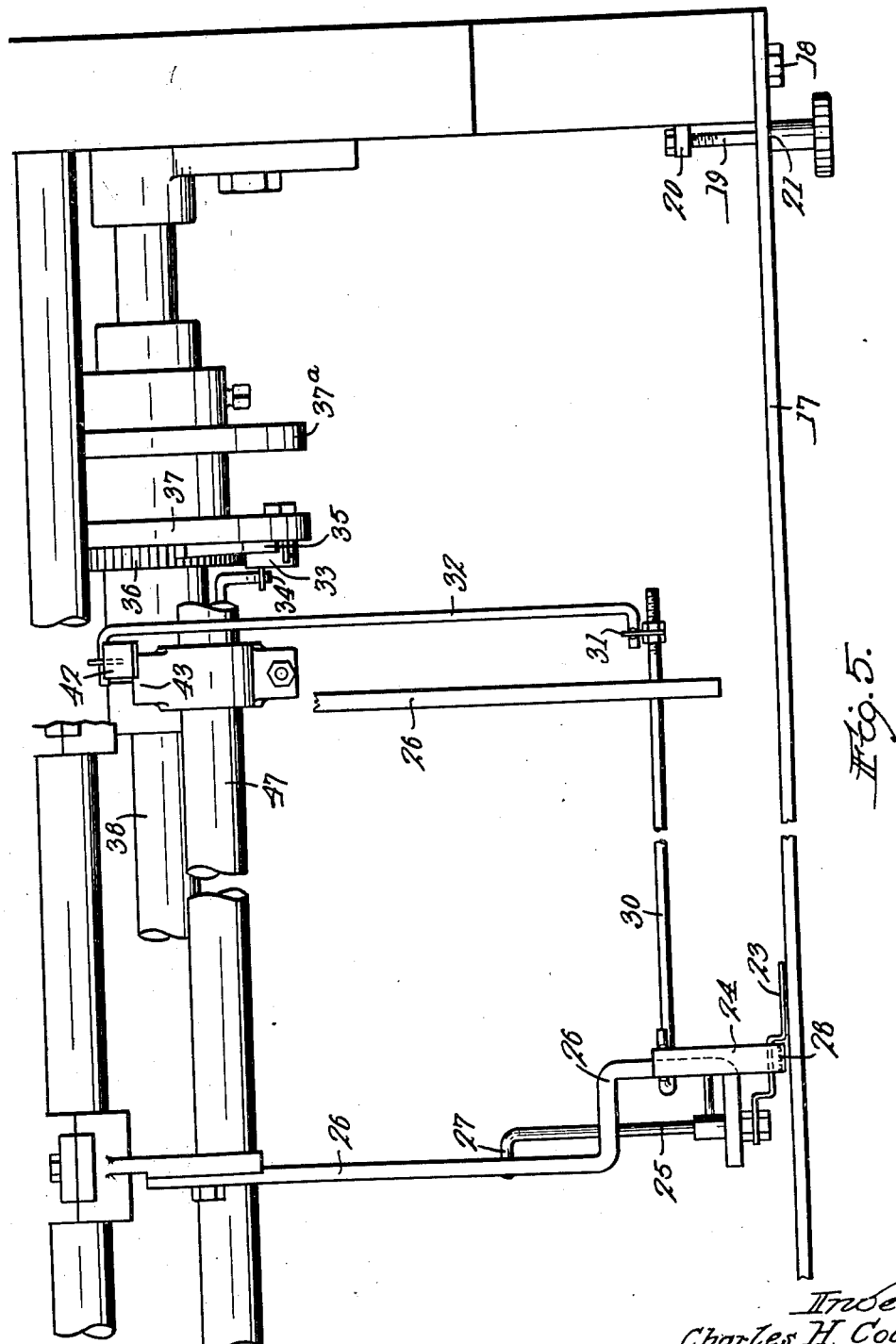
Fig. 5 is a plan of the detecting and the interrupting mechanism.
Figure 6:
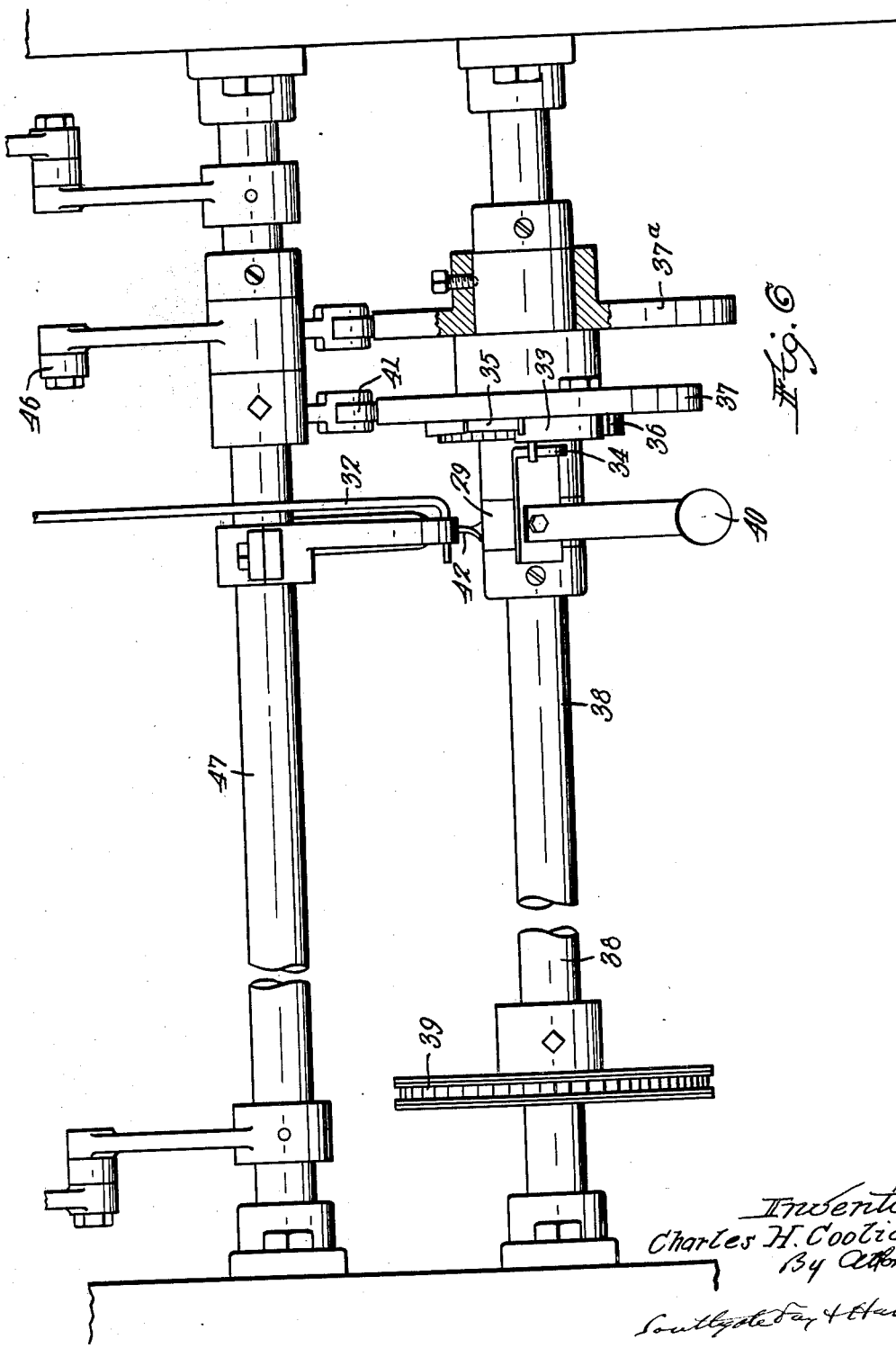
Fig. 6 is an elevation partly in section of the interrupting mechanism.
Figure 7:
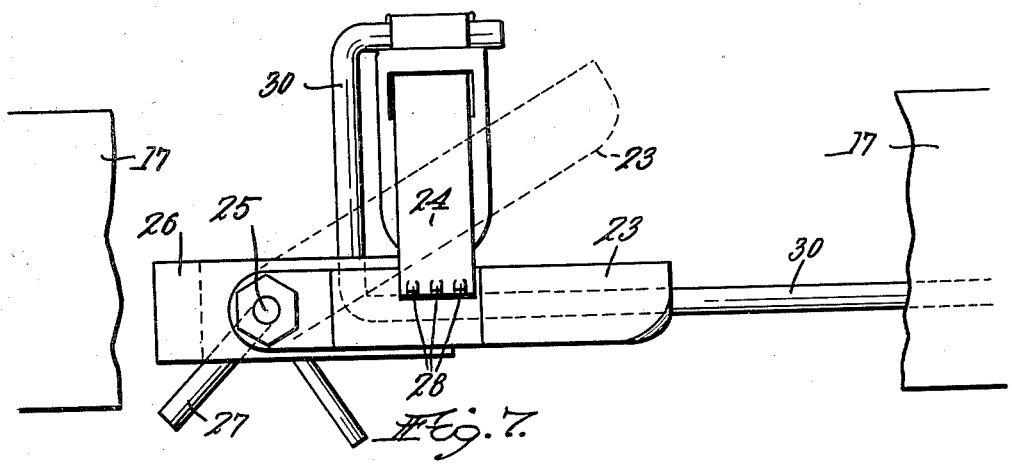
Fig. 7 is an end view of the detecting and interrupting operation means.
Figure 8:
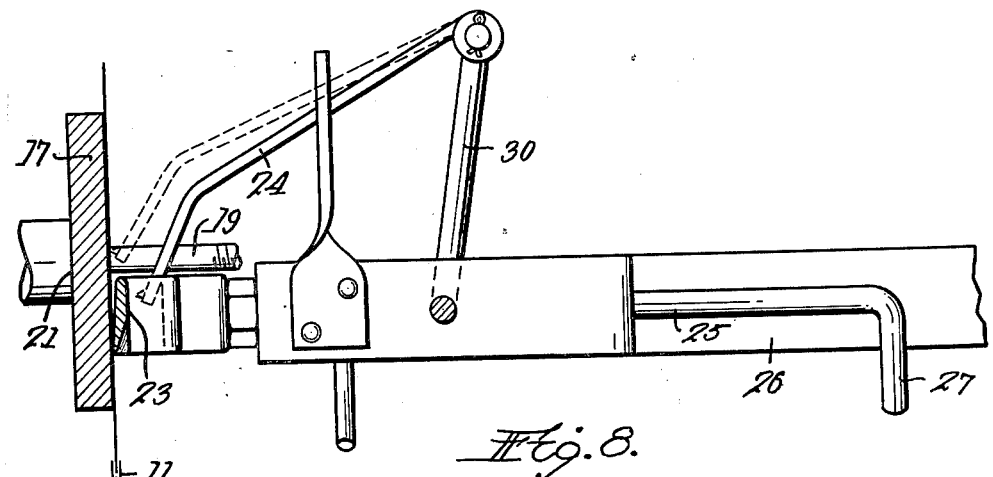
Fig. 8 is a side view of the same showing the cloth guide in section.

It will be seen that a cam roller 41 on the surface of the cam 37 is actuated by the cam. The bell crank 45 on which the roller 41 is located operates a link 46 which is mounted to swing with a parallel motion on two shafts 47. Connected with the link is a lever 48. With it is connected a spring 49 to move it back and keep the roll 41 on the cam 37. A separate rod and lever is operated in the same way to depress the cloth at each shear. Each one of these levers is connected by a pin 50 and slot 51 with a slide 52. This slide is guided in guides 53 fixed on the frame so as to move in a straight line, although the lever that operates it moves in a half circle. On this slide is mounted a protecting plate or blade 54. This slide, both levers moving in arcs of circles working in unison, carries the plate into protecting position, as shown in Figs. 3 and 4, just when the seam 11 comes into registration with the shear.

The several cams 37, 37ª, etc. are so related to each other that each one of the deflecting blades 54 will come into operation at the proper time. This sliding blade 54 is moved in a direction almost parallel with the cloth at the point at which it engages the cloth. On account of the fact that it is positively guided in the manner stated, it moves accurately and smoothly and without chatter. This is an important feature because the swinging blade shown by Broman is necessarily pivoted at some distance from the blade itself and, at such high speeds as are now employed, it cannot be operated ordinarily without vibration. This vibration is entirely eliminated by the sliding construction, although the blade is operated by a pivoted lever as before. This is an important feature of this invention.

From what has been stated it will be seen that the above mentioned advantages are fully secured. Preferably all the blades are operated at such times that the cloth is prevented from being sheared all the way from the first shear to the last.

In Figs. 11 and 12 a substitute for the guide bar 17, which is adjusted to secure exactly the proper action of the detector finger, is shown. In place of this bar 17 an eccentric rod 56 is employed as a guide mounted in bearings 57 on the frame. This rod can be turned to bring its surface at exactly the right point to cooperate with the detector finger, as shown in Fig. 12. The same results are secured.

While the device is designed with special reference to the butt seamed fabric, the operation is equally efficient on any seam or any irregularity in the surface of the cloth that shall add to the normal thickness of the same. While the introduction of the plate into protecting position may change the line of cloth between the twin edges of the gap rest, a proper adjustment introduces the thickness of the plate between the cloth and the shearing unit.

Although I have shown and described only one form of the main features of the invention and only two forms of the guide or gauge for the cloth, I am aware of the fact that other modifications can be made therein by persons skilled in the art, without departing from the scope of the invention as expressed in the claims. Therefore I do not wish to be limited to the exact form shown, but what I do claim is:—

1. In a cloth shearing machine, the combination with a shear, of a guide along the surface of which the cloth is caused to travel, a feeler finger movably mounted and located in position to clear the cloth as it passes over said guide but to be engaged by projections from the surface of the cloth and moved thereby, and a contacting finger normally located in position to be moved by the motion of the feeler finger into contact with the running cloth, said contacting finger having means for engaging the cloth, whereby the motion of the cloth will move the contacting finger, and means connected with the contacting finger and operated thereby for deflecting the cloth from the shear, for the purpose described.

2. In a cloth shearing machine, the combination with a shear and a gap rest for the cloth, of a guide along the surface of which the cloth is caused to travel, a feeler finger movably mounted and located in position to clear the cloth as it passes over said guide but to be engaged by the threads of a seam in the cloth and moved thereby, and a contacting finger normally located in contact with the feeler finger and in position to be moved by the motion of the feeler finger into contact with the running cloth, said contacting finger having means for engaging the cloth, whereby the motion of the cloth will move the contacting finger a material distance, means for pivotally mounting the contacting finger, and means connected with the contacting finger and operated thereby for deflecting the cloth from the shear, for the purpose described.

3. In a cloth shearing machine, the combination of a detector finger, a contact finger located in position to be operated by the detector finger when the latter is moved by a seam in the cloth, said contact finger having means for engaging the cloth in such a way that the cloth will thereafter move the contact finger, a blade for protecting the cloth at the seam, and means connected with the contact finger for controlling the operation of the protecting blade.

4. In a cloth shearing machine, the combination of a detector finger, a contact finger located in position to be engaged by the detector finger when the latter is moved by a seam in the cloth, said contact finger having means for engaging the cloth in such a way that the cloth will thereafter move the contact finger, a protecting blade for engaging the cloth at the shear and protecting the same, means connected with the contact finger for controlling the operation of the protecting blade, and adjustable means for regulating the action of the detector finger in accordance with the thickness of the fabric and the seam by which two lengths of fabrics are sewed together.

5. In a cloth shearing machine comprising a shear, the combination with a guide along the surface of which the cloth travels, of a movable detector finger adjusted to a position in which the cloth will not move it, but a seam consisting of a thread on the cloth will move it, a contact finger movable by the action of the detector finger, said contact finger having means for impinging on the cloth so that the cloth will move the contact finger out of contact with the cloth, and means operated by the contact finger to deflect the fabric from a shear of the machine at a point predetermined by the position in which the detector finger is operated to prevent the shearing of the cloth at a time when the seam on the cloth reaches the shear.

6. In a cloth shearing machine, the combination with a shear, of a guide along the surface of which the cloth travels, a detector finger pivoted on an axis perpendicular to said guide and in position to be moved by threads on the cloth forming a seam, a contact finger pivoted on an axis parallel with the surface of the guide and located in position to be moved by the detector finger toward the cloth, the contact finger having means by which the cloth will move it in the direction of travel of the cloth and out of contact with the cloth, and means operated by the contact finger for deflecting the cloth out of contact with the shear at the time when the said threads come into registration with the shear.

7. In a cloth shearing machine, the combination with the shear and an adjustable guide along the surface of which the cloth is guided, of a detector finger in position to be moved by seams on the cloth, but not to be moved by the cloth itself, a contact finger resting on the detector finger and having means for projecting into the cloth, said detector finger being so mounted that when the contact finger moves it the running cloth will move the end of the contact finger along its course, the contact finger being pivoted in such a way that the movement of the cloth will swing it back out of contact with the cloth, a running shaft, a ratchet wheel fixed to the shaft, a member loose on the shaft, a pawl on said member for engaging the ratchet wheel, means operated by the contact finger for releasing the pawl to engage the ratchet wheel, whereby the ratchet wheel will rotate said member with the shaft, and means operated by said member for deflecting the cloth from the shear.

8. In a cloth shearing machine, the combination with the shear, of a detector finger in position to be moved by seams on the cloth, a contact finger resting on the detector finger and having means for projecting into the cloth, said detector finger being so mounted that when the contact finger moves it the running cloth will move the end of the contact finger along its course, the contact finger being pivoted in such a way that the movement of the cloth will swing it back out of contact with the cloth, a running shaft, a ratchet wheel fixed to the shaft, a cam loose on the shaft, a pawl on the cam for engaging the ratchet wheel, means for normally holding the pawl out of engagement with the ratchet wheel, means connected with the contact finger for removing said means from the pawl, whereby the ratchet wheel will rotate the cam with the shaft, and means operated by the cam for deflecting the cloth from the shear.

9. In a cloth shearing machine, the combination with the shear, of a detector finger in position to be moved by stitches on the cloth, a contact finger resting on the detector finger, a revolvable shaft, a ratchet wheel fixed to the shaft, a cam loose on the shaft, a pawl on the cam for engaging the ratchet wheel, means for normally holding the pawl out of engagement with the ratchet wheel, means connected with the contact finger for removing said means from the pawl, whereby the ratchet wheel will rotate the cam with the shaft, and means operated by the cam for deflecting the cloth from the shear.

10. In a cloth shearing machine, the combination of a guide along which the surface of the cloth is directed, said guide comprising a flexible bar and means for flexing the guide to adjust its position at a point between the supports therefor, of a feeler finger located adjacent to the surface of the guide in a position to be moved by a seam in the cloth, a contact finger in position to be moved by the action of the deflector finger into contact with the cloth and means operated by the contact finger for deflecting the cloth out of shearing position.

11. A guide for the cloth in a shearing machine comprising a metallic flexible bar, means for rigidly supporting the bar at both ends, a screw between the supports passing freely through the bar and adapted to be adjusted by turning it and having a shoulder for engaging the bar for adjusting the position of the center of the bar.

12. A guide for the cloth in a shearing machine comprising a metallic bar and means for rotatably supporting the bar at both ends, said bar being eccentrically mounted, whereby it can be turned on its supports to adjust its effective guiding surface.

13. In a shearing machine, the combination with a shear and a gap rest for supporting the cloth at two points on each side of the shear in position for shearing, of a fixed rigid guide, a rod guided by the guide, a blade fixed to said rod and movable between the shear and the gap rest to deflect the cloth from the shear, and pivotal means for reciprocating the rod and blade in a plane.

14. In a cloth shearing machine, the combination with the shear and a guide along the surface of which the cloth is guided, of a detector finger in position to be moved by seams on the cloth, but not to be moved by the cloth itself, a contact finger resting on the detector finger and having barbs for projecting into the cloth, and means operated by the contact finger for deflecting the cloth from the shear.

15. In a cloth shearing machine, the combination with a shear and a gap rest adjacent the shear for the cloth, of two pairs of rigid spaced guides adjacent the shear, a rod arranged to be guided accurately on each pair of guides, means for reciprocating said rods in said guides, and a blade secured to said rods, the guides being so placed that the blade will be moved substantially tangentially to the shear against the cloth bearing on the two edges of said gap rest.

CHARLES H. COOLIDGE.